United States Patent [19]
Goltz

[11] 3,852,123
[45] Dec. 3, 1974

[54] SEALING RINSES FOR PHOSPHATE COATINGS ON METAL
[75] Inventor: Kurt Goltz, Exton, Pa.
[73] Assignee: Pennwalt Corporation, Philadelphia, Pa.
[22] Filed: Nov. 20, 1972
[21] Appl. No.: 308,072

[52] U.S. Cl............ 148/6.14, 117/71 M, 117/130 R, 117/160 R, 148/6.15, 148/6.16
[51] Int. Cl................................................ C23c 3/00
[58] Field of Search..... 117/69, 70 C, 71 M, 130 R, 117/160 R; 148/6.14, 6.15, 6.16, 6.27; 260/448; 423/395, 476, 475, 495

[56] References Cited
UNITED STATES PATENTS
2,737,498  3/1956  Frasch............................ 148/6.16 X
3,116,178  12/1963  Upham............................... 148/6.15
3,365,377  1/1968  Michelson....................... 148/6.27 X
3,664,887  5/1972  Atkiss................................ 148/6.16

Primary Examiner—Herbert B. Guynn
Assistant Examiner—Bruce H. Hess
Attorney, Agent, or Firm—Robert G. Danehower

[57] ABSTRACT

This invention provides new sealing rinses and processes for their application to phosphate coated metals to seal against porosity and to promote the adhesion of subsequent paint coatings. The new sealing rinses are aqueous solutions of aluminum polymers. In the application of the sealing rinses, steel, galvanized steel, zinc and aluminum are given a phosphate coating and wetted with the aqueous aluminum polymer.

16 Claims, No Drawings

SEALING RINSES FOR PHOSPHATE COATINGS ON METAL

BACKGROUND OF THE INVENTION

Phosphate coatings on metals are widely known as useful adhesion promoters for paint, varnish lacquer and the like, and their application is one of the standard procedures of the metal finishing industry. Beside adhesion, the phosphate coatings also provide some protection against under-paint corrosion, but normally not enough. It was found long ago that the under-paint corrosion protection of phosphate coatings is greatly enhanced when the phosphate coated metal is rinsed with a dilute acid chromate solution prior to paint application, and almost every proprietary phosphate coating process specifies these chromate rinses which are also called sealing rinses or chromate seals.

However, there are disposal problems connected with the usage of chromates. It was customary to dump waste effluents from run-offs and used-up chromate solutions into the local sewage system or even right into a neighboring river. Chromates are considered toxic. They can interfere with the proper function of a sewage plant and can poison wild life in streams and rivers. Because of the tremendous increase of industrial production in the last two decades, water pollution has become a major problem. Society as a whole is not willing to tolerate any more dumping of dangerous chemicals into the nation's water resources. Many state and local governments now prohibit any chromate run-off into streams, rivers, lakes or even the municipal sewage systems. Chromates can be removed from waste effluents but it is a costly two-step operation requiring substantial space and processing equipment.

The difficulties in the disposal of chromium containing wastes are largely avoided by the use of the aluminum polymer solutions of this invention. Aluminum is one of the most common elements in nature. Many rocks contain aluminum and aluminum is also one of the main constituents of clay. There is no known adverse effect of aluminum compounds to animal and plant life in water at the low concentrations prevailing in nature, providing the other constituents of the compounds are of low toxicity also. However, if it would be necessary to remove these chemicals from the waste effluents, that can be done by a simple neutralization and it does not require the sophistication necessary for the treatment of chromates.

While the chromates might give superior performance for some applications, in many cases, the performance of the compounds of this invention is sufficient to fulfill required specification. The great advantage with these aluminum compounds is their low toxicity.

BRIEF DESCRIPTION OF INVENTION

I have now discovered that certain aluminum polymers are effective sealing rinses for phosphate coated metals such as steel, galvanized steel, zinc and aluminum. The nontoxic aluminum polymer sealing rinses are designed to replace the chromic acid sealing rinse which creates a waste disposal problem because of its toxicity.

The aluminum polymers are prepared by adding aluminum hydroxide dried gel slowly to acid solutions or solutions of acid salts under carefully controlled conditions. In order to obtain the polymer solutions one mole of aluminum is added to one mole of monobasic acid or acid salt. The temperature of the acid or acid salt solution will generally be between room temperature and about 200°F. The aluminum polymers are clear viscous solutions.

Aluminum polymer solutions which have provided effective rinses for sealing phosphate coatings are aluminum nitrate polymer, aluminum formate polymer, aluminum chloride polymer, aluminum perchlorate polymer, aluminum iodide polymer, aluminum lactate polymer, aluminum oxalate polymer, and mixtures thereof.

The polymer solutions are applied to the phosphate coatings in the same manner as the well known chromic acid sealing rinses. The concentration of the polymer solution may vary from 0.025% by weight aluminum to about 0.25% by weight. Higher concentrations are unnecessary. The temperature of application and the time of application are not critical. The temperature may vary from ambient temperature to about 200°F. The time of the sealing rinse in contact with the phosphate coating may vary from about 1 second to about 1 hour.

After the aluminum polymer sealing rinses are applied to the phosphate coated metal, the metal may then be either washed with water, preferably deionized water and then the metal is dried. Preferably, the metal wetted with the aluminum polymer sealing rinse is dried without any water rinse, or the metal wetted with the aluminum polymer sealing rinse is first dried, then rinsed with water, preferably deionized water and then redried. The latter two procedures give better underpaint corrosion resistance then the first procedure embodying the water rinse prior to drying. The drying of the rinsed panels is done by any conventional way currently employed in the metal treating industry. The drying temperatures are not critical and will vary from room temperature to about 180°F. or higher as measured on the treated metal surfaces. To prevent flash rusting which occurs occasionally when iron phosphate coatings are dried I may add from 0.1 gram per liter to 10 grams per liter of triethanolamine nitrate to the solution of the aluminum polymer.

DETAILED DESCRIPTION OF THE INVENTION

The aluminum polymer rinses of my invention are useful in sealing phosphate coatings on any metal substrate which carries a phosphate coating to increase resistance to corrosion and to enhance the bonding of paint or lacquer coatings. Generally, the substrate will be steel, galvanized steel, zinc or aluminum.

The aluminum polymer sealing rinses of this invention are applicable to either the heavy-weight coating phosphates derived from aqueous zinc or manganese phosphate solutions or the light-weight phosphate coatings, generally called iron phosphate coatings, derived from aqueous solutions of acid sodium, potassium, and ammonium phosphates.

The metal substrates must be clean for application of the phosphating solutions and the metal surfaces are first cleaned by physical and/or chemical means well known in the art to remove surface dirt, grease, or oxides.

The heavy-weight zinc phosphate coating solutions may be prepared and applied to steel, galvanized steel, zinc and aluminum metal as disclosed in U.S. Pat. No. 3,203,835, U.S. Pat. No. 3,619,300 and other patents. The preparation and use of the chromic acid sealing rinse which this invention displaces is described in U.S. Pat. No. 3,116,178 and other patents. The light-weight iron phosphate coating solutions may be prepared and applied to steel, galvanized steel, zinc and aluminum as described in U.S. Pat. No. 3,129,121, U.S. Pat. No. 3,152,018 and other patents. The phosphating solutions are applied by immersion, spraying, wiping and/or by roller coating as is well known in the art. After application of the phosphate coating, the coated metal is rinsed with water and then is contacted with the aluminum polymer sealing rinses of my invention. If it is necessary to store the phosphate coated metal before sealing, it is preferable to dry the water rinsed metal by conventional methods.

The aluminum polymers which are effective sealing rinses for phosphate coated steel, galvanized steel, zinc and aluminum are selected from the group consisting essentially of aluminum nitrate polymer aluminum formate polymer, aluminum chloride polymer, aluminum perchlorate polymer, aluminum iodide polymer, aluminum oxalate polymer, aluminum lactate polymer, and mixtures thereof. The aluminum polymers are applied to the metal substrates as aqueous solutions.

The concentrations of the aluminum polymers in water which are useful in sealing the phosphate coatings vary from 0.25 grams per liter of aluminum or 0.025% by weight aluminum to about 2.5 grams per liter of aluminum or 0.25% by weight of aluminum. The concentrations of the polymers in aqueous solution are expressed in terms of aluminum since the polymer concentrations can be easily determined by analysis for aluminum. Conveniently, stock solutions of the aluminum polymers in water are provided in which the concentration is about 5 grams to 10 grams per liter expressed as concentration of aluminum. These stock solutions are then diluted with water, preferably with deionized water, for application as sealing rinses. Concentrations higher than 2.5 grams per liter of aluminum may be used but no additional sealing benefit has been observed.

The phosphate coated metal substrates are contacted with the aluminum polymer sealing rinse in the same manner as the chromic acid sealing rinse is applied. Contact time varies from about 1 second to a minute as in spray coating and from several minutes to an hour when the contact is by immersion. The contact time is not critical and in those instances in which the aluminum polymer solution is rinsed with deionized water before drying, the contact time will be measured by the interval from the time of immersion or aluminum polymer spray application to the time of water rinse.

In another aspect of my invention the aluminum polymer solution is dried on the phosphate coating without water rinsing and in this process the contact time of the polymer solution with the phosphate coating may extend to about 60 minutes depending on how soon the metal is subjected to drying conditions and on the drying conditions employed. When the aluminum polymer solution is dried on without a water rinse, generally greater resistance to corrosion, and greater bonding adhesion is obtained than when the sealing solution is rinsed with deionized water prior to drying.

The resistance to under-paint corrosion is generally observed by salt spray tests as set forth in A.S.T.M. Standard B 117 and A.S.T.M. — D1654 evaluation procedure. In both the salt spray test and under-paint corrosion tests referred to above, the phosphate coated metal is treated with the aluminum polymer sealing rinse after which the metal is painted before being tested.

The best manner of applying the aluminum polymer sealing rinses is to contact the phosphate coated substrate with the sealing rinse, dry the metal wetted with aluminum polymer solution and finally rinse the phosphate coating which has been sealed with the aluminum polymer solution with deionized water and then redry the metal. This manner of sealing the phosphate coatings gives the highest ratings in the salt spray and adhesion tests.

The temperature of the sealing rinse is not critical and may vary from room temperature to about 180°F. Temperatures higher than 180°F. lead to an excessive amount of steam in the processing area without contributing to any increase in the effectiveness of the sealing rinse.

Where the sealing rinse is to be dried on the phosphate coating without intermediate water rinse, a hot aluminum polymer solution will leave a substantial amount of heat in the metal which will assist in the drying operation. Temperaturs of about 130° to 150°F. are generally encountered in the processing lines and this range is preferred.

In another aspect of my invention the corrosion resistance of the phosphate coatings sealed with the aluminum polymer solutions are enhanced by the addition of from 0.1 grams per liter to 1 gram per liter of triethanolamine nitrate. Greater amounts of triethanolamine nitrate than 1 gram per liter can be used without obtaining additional benefits.

The aluminum polymers useful in the sealing of phosphate coatings are prepared by adding aluminum hydroxide dried gel slowly and with agitation to an acid or acid salt of aluminum under carefully controlled conditions. If the aluminum hydroxide dried gel is added too quickly to the acid solution, a basic salt of aluminum will precipitate out of solution and be lost since the precipitates are insoluble.

The amount of aluminum hydroxide dried gel which is added to the acid should not exceed 1 mole aluminum hydroxide for each mole of monobasic acid present. Amounts greater than the 1 to 1 ratio will result in formation of insoluble precipitates, consisting of basic aluminum salts and/or aluminum hydroxides and oxides. On the other hand, amounts smaller than the 1 to 1 mole ratio will produce a mixture of the aluminum polymer and crystalline aluminum salt of the acid. Such mixtures are less effective as phosphate sealing rinses due to increase in acidity. As distinguished from the 1 to 1 mole ratio used above, in preparing a crystalline aluminum salt of a monobasic acid such as nitric acid, three moles of monobasic acid would be reacted with 1 mole of aluminum.

If the aluminum hydroxide dried gel is added too rapidly to the acid, formation of a mixture of the polymer, the aluminum salt of the acid and insoluble preciptates of aluminum oxide or hydroxide may take place. Temperatures should be maintained within about 160°F. to 200°F. during the addition of the aluminum hydroxide dried gel and external application of heat is usually necessary. Agitation of the mixture is necessary during the addition of the gel to obtain the desired reaction.

As used throughout this specification and in the claims, the term aluminum polymer defines an aluminum composition prepared as described above. The aluminum polymers such as aluminum nitrte polymer are clear viscous solutions. When dried, they form clear glasses which can be redissolved readily in water. The formation of aluminum nitrate polymer is described in Z. Anorg. U. Allgem. Chem., V. 200, page 257–278 and the polymeric structure was represented as $(AlO\text{-}NO_3)_8$. The preparation of aluminum polymers useful in sealing phosphate coated metals is described below:

PREPARATION OF ALUMINUM NITRATE POLYMER 6,750 Grams of deionized water were placed in a stainless steel vessel equipped with a stirrer and means for applying heat. 6,580 Grams of nitric acid (70.9% concentrate) were added to the water while stirring. To the stirred acid solution, 6,670 grams of aluminum hydroxide dried gel (56.9% $Al_2O_3$), available from Chatten Chemical Company, were added to the stirred acid solution over a period of two and one-half hours. The temperature was controlled so that the solution did not exceed 190°F. A slightly viscous clear solution with a small amount of insolubles was obtained. The insolubles settled to the bottom when the stirring was discontinued. The viscous solution had a specific gravity of 1.422 at 75°F. It analyzed 10.0% aluminum by gravimetric analysis. A convenient way to assess the aluminum content is by titration with tenth normal sodium hydroxide using phenolphthalein indicator.

PREPARATION OF ALUMINUM FORMATE POLYMER 55.9 Grams of deionized water and 27.8 grams of a commercial grade of basic (94.8% concentration), obtained from the Aceto Chemical Company, were placed in a stainless steel flask equipped for stirring and heating. 16.3 Grams of aluminum hydroxide dried gel (58.1% $Al_2O_3$) were added over a period of about 1 hour. The temperature was maintained at 180°–190°F. The reaction gave a clear viscous solution of aluminum formate polymer containing 10% aluminum. Alternatively, the equivalent aluminum formate polymer was obtained by adding one mole of aluminum hydroxide dried gel to one mole of a mixture of formic acid in deionized water.

PREPARATION OF ALUMINUM CHLORIDE POLYMER 46.7 Grams of deionized water and 29.8 grams of aluminum chloride with six waters of hydration were added to a stainless steel flask equipped for stirring and heating. To this solution, 23.5 grams of aluminum hydroxide dried gel (53.6% $Al_2O_3$) were added while maintaining a temperature of 170° to 190°F. A clear viscous solution was obtained analyzing 10% aluminum.

PREPARATION OF ALUMINUM PERCHLORATE POLYMER 61.4 Grams of perchloric acid (61% concentrate) and 3.3 grams of deionized water were placed in a stainless steel flask equipped for stirring and heating. Over a period of an hour and one-half, 35.3 grams of aluminum hydroxide dried gel (53.6% $Al_2O_3$) were added while stirring and heating. The temperature was controlled within the range of 160° to 200°F. A clear viscous solution of aluminum perchlorate was obtained analyzing 10% aluminum.

PREPARATION OF ALUMINUM IODIDE POLYMER 81.0 Grams of hydriodic acid (58.5% concentrate) was placed in a stainless steel flask equipped for stirring and heating. 35.3 Grams of aluminum hydroxide dried gel (53.6% $Al_2O_3$) were added while maintaining a temperature within the range of 170° to 190°F. Heating was necessary to maintain this temperature. A clear viscous solution was obtained at the completion of the aluminum hydroxide gel addition. In order to obtain a 10% aluminum concentrate, it was necessary to evaporate 16.3 grams of water. A small amount of iodine was formed during the reaction. In the same manner as described above aluminum polymers of oxalic acid and lactic acid were prepared.

Using the same procedure as described above attempts were made to prepare aluminum polymer solutions derived from aluminum hydroxide dried gel and acetic, acrylic and picric acids. These acids did not yield soluble compounds with the aluminum but rather formed insoluble precipitates unsuitable as sealers for phosphate coatings. Similarly, I was unable to make an aluminum iodate polymer. When I tried to make aluminum polymers from nitrous acid and sulfuric acids an unstable composition was formed and it disproportionated into free acid and insoluble aluminum compounds.

The efficiency of the aluminum polymer solutions as sealing rinses for phosphate coatings were evaluated by testing the adhesion of an alkyd enamel paint baked on a phosphate coating on a metal substrate. Thereafter the painted enamel is subjected to a salt spray test and paint adhesion evaluation in accordance with the procedure of the American Society for Testing Materials, Test B117 and D1654.

Stock solutions of aluminum polymers at a concentration of 10% by weight aluminum were diluted with deionized water to a concentration of 0.05% aluminum. These solutions are identified in the following tables as Sealer A — aluminum nitrate polymer; Sealer B — aluminum formate polymer; Sealer C — aluminum lactate polymer; Sealer D — aluminum oxalate polymer.

EXAMPLE 1

Cold rolled mild steel panels were cleaned in a proprietary alkaline liquid spray cleaner, water rinsed and then spray coated with a proprietary iron phosphate coating compound. This compound yields an amorphous iron phosphate coating of bluish-gray color on the steel. The coating weight was about 35 mg/ft². After coating, the panels were water rinsed.

The phosphate coated panels were dipped into the respective sealer solutions, A to D — held at room temperature and immersed for 30 seconds. Following immersion the phosphate coated panels were treated in three different finishing procedures as follows:

1. The panels were removed from the sealing solution, rinsed with deionized water and oven dried;
2. The panels were oven dried without rinsing until the surface was dry, then rinsed with deionized water and redried;
3. The panels were oven dried without any water rinse.

The evaluation results appear in the Table I. The ratings are from 0 to 10. In this rating, 0 denotes a complete failure, 6 is a fair result, acceptable in most cases, while 10 in the ASTM scale would stand for a completely unimpaired panel. The control did not have any exposure to a sealing solution.

TABLE I

IRON PHOSPHATE

| Sealer | (1) Water Rinse and Oven Dried | (2) Oven Dried, Water Rinse and Redried | (3) Oven Dried Without Water Rinse |
|---|---|---|---|
| A | 0 | 6 | 6 |
| B | 0 | 6 | 6 |
| C | 0 | 0 | 0 |
| D | 0 | 0 | 0 |
| Control | 0 | — | — |

EXAMPLE 2

Cold rolled mild steel panels were cleaned in a proprietary alkaline liquid spray cleaner, water rinsed and then spray coated with a proprietary zinc phosphate coating compound. This compound yielded a crystalline zinc phosphate coating of gray color with a coating weight of 399 mg/ft². After coating, the panels were water rinsed and then finished in the same way as the panels of the first example. The adhesion evaluations are set forth in Table 2. The ratings have the same value as in Experiment 1. The control did not have any treatment with the aluminum polymer sealing solutions.

TABLE 2

ZINC PHOSPHATE

| Sealer | (1) Water Rinse and Oven Dried | (2) Oven Dried, Water Rinse and Redried | (3) Oven Dried Without Water Rinse |
|---|---|---|---|
| A | 7.0 | 8.5 | 8.0 |
| B | 7.5 | 9.0 | 8.5 |
| C | 6.5 | 8.0 | 5.0 |
| D | 7.0 | 6.5 | 4.0 |
| Control | 6.5 | — | — |

EXAMPLE 3

Aluminum nitrate polymer (a) and aluminum formate polymer (b) solutions having an aluminum assay of 10% were diluted with deionized water to make dilute solutions of the following concentrations: 0.25 g/l Al, 0.5 g/l Al, 1.0 g/l Al, 2.5 g/l Al. Also, a solution was prepared consisting of a mixture of A and B in the proportion of 1:1 and having a concentration of 1.0 g/l Al. Cold rolled mild steel panels were cleaned and coated with the iron phosphate respectively, zinc phosphate compounds of the prior examples and then rinsed, painted and tested in the same as before. The evaluations on iron phosphate coatings appear in Table 3 — Iron and the evaluations on zinc phosphate coatings appear in Table 3 — Zinc.

TABLE 3

IRON PHOSPHATE

| Sealer | Polymer Concentration as Aluminum | (1) Water Rinse and Oven Dried | (2) Oven Dried, Water Rinse and Redried | (3) Oven Dried Without Water Rinse |
|---|---|---|---|---|
| A | 0.25 g/l | 1.0 | 5.0 | 4.0 |
| A | 0.5 g/l | 1.5 | 4.5 | 4.5 |
| A | 1.0 g/l | 1.5 | 5.0 | 5.0 |
| A | 2.5 g/l | 2.5 | 3.5 | 0 |
| B | 0.25 g/l | 2.5 | 5.0 | 5.0 |
| B | 0.5 g/l | 0.5 | 5.0 | 5.0 |
| B | 1.0 g/l | 2.5 | 4.0 | 5.0 |
| B | 2.5 g/l | 3.5 | 2.0 | 0.5 |
| A & B | 1.0 g/l | 0 | 4.0 | 4.0 |
| Control | No Seal | 0 | — | — |

ZINC PHOSPHATE

| Sealer | Polymer Concentration as Aluminum | (1) Water Rinse and Oven Dried | (2) Oven Dried, Water Rinse and Redried | (3) Oven Dried Without Water Rinse |
|---|---|---|---|---|
| A | 0.25 g/l | 6.5 | 7.0 | 7.0 |
| A | 0.5 g/l | 6.0 | 7.0 | 7.0 |
| A | 1.0 g/l | 6.5 | 8.0 | 7.0 |
| A | 2.5 g/l | 6.0 | 7.5 | 5.0 |
| B | 0.25 g/l | 6.0 | 6.5 | 5.0 |
| B | 0.5 g/l | 6.0 | 7.0 | 6.5 |
| B | 1.0 g/l | 5.5 | 7.5 | 7.0 |
| B | 2.5 g/l | 6.0 | 7.0 | 5.5 |
| A & B | 1.0 g/l | 7.0 | 8.0 | 8.0 |
| Control | No Seal | 6.5 | — | — |

EXAMPLE 4

Viscous polymeric solutions of aluminun lactate polymer (E) were prepared and diluted with deionized water to a concentration of 0.1% aluminum concentration. The efficiency of the aluminum lactate polymer was evaluated by the same procedure as set forth in Example 1 and the results appear in Table 4.

TABLE 4

IRON PHOSPHATE

| Sealer | (1) Water Rinse and Oven Dried | (2) Oven Dried, Water Rinse and Redried | (3) Oven Dried Without Water Rinse |
|---|---|---|---|
| E | 1.5 | 0.5 | 0 |
| Control | 0 | — | — |

ZINC PHOSPHATE

| Sealer | (1) Water Rinse and Oven Dried | (2) Oven Dried Water Rinse and Redried | (3) Oven Dried Without Water Rinse |
|---|---|---|---|
| E | 7.0 | 7.0 | 4.5 |
| Control | 6.5 | — | — |

EXAMPLE 5

Under adverse drying conditions of the phosphate coated and water rinsed panels, particularly where low coating weights are obtained as when using iron-phosphate coatings, sometimes a slight flash rusting was observed. To correct the flash rusting, small amounts of triethanolamine nitrate were added to aluminum nitrate polymer assaying at 0.027% by weight aluminum. The rinse solutions are identified as follows: Sealer — Aluminum nitrate polymer at a concentration of 0.027% weight aluminum (F); polymer solution F with 0.1 grams per liter of triethanolamine nitrate (G); polymer solution F with 1.0 grams per liter of triethanolamine nitrate (H); polymer solution F with 10 grams per liter of triethanolamine nitrate (I); and 1.0 grams per liter of triethanolamine nitrate without any aluminum nitrate polymer (J). The solutions were evaluated by the procedures set forth in Example 1. Results appear in Table 5.

TABLE 5

IRON PHOSPHATE

| Sealer | (1) Water Rinse and Oven Dried | (2) Oven Dried, Water Rinse and Redried | (3) Oven Dried Without Water Rinse |
|---|---|---|---|
| F | 3.0 | 5.0 | 4.5 |
| G | 2.5 | 6.0 | 4.0 |
| H | 6.5 | 6.5 | 4.5 |
| I | 4.5 | 4.5 | 0 |
| J | 0 | 0 | 0 |
| Control | 0 | — | — |

ZINC PHOSPHATE

| Sealer | (1) Water Rinse and Oven Dried | (2) Oven Dried, Water Rinse and Redried | (3) Oven Dried Without Water Rinse |
|---|---|---|---|
| F | 6.0 | 9.0 | 7.5 |
| G | 6.5 | 9.0 | 7.5 |

TABLE 5-Continued

ZINC PHOSPHATE

| Sealer | (1) Water Rinse and Oven Dried | (2) Oven Dried, Water Rinse and Redried | (3) Oven Dried Without Water Rinse |
|---|---|---|---|
| H | 7.5 | 8.5 | 5.5 |
| I | 7.0 | 7.0 | 3.5 |
| J | 7.0 | 6.5 | 6.5 |
| Control | 6.5 | — | — |

EXAMPLE 6

Aluminum chloride polymer solution (K), aluminum chlorate polymer solution (L) and aluminum iodide polymer solution (M) were diluted to a concentration of 0.054% aluminum and tested for efficiency as sealing rinses for zinc phosphate coatings using the procedures in Examples 1. The evaluations appear in Table 6.

TABLE 6

ZINC PHOSPHATE

| Sealer | (1) Water Rinse and Oven Dried | (2) Oven Dried, Water Rinse and Redried | (3) Oven Dried Without Water Rinse |
|---|---|---|---|
| K | 3.0 | 5.5 | 4.75 |
| L | 3.0 | 6.5 | 5.5 |
| M | 4.0 | 6.5 | 3.5 |
| Control | 4.5 | — | — |

Note: This was an inferior batch of steel. Therefore, all the results are about 2 points below the previous ones.

I claim:

1. The process of sealing a phosphate coated metal comprising wetting the phosphate coated metal by contacting it for a period ranging from about 1 second to about 1 hour with an aqueous solution having a temperature ranging from ambient temperature to about 200°F. of one or more aluminum polymers having a concentration of at least about 0.25 grams per liter of aluminum and selected from the group consisting of aluminum nitrate polymer, aluminum lactate polymer, aluminum formate polymer, aluminum oxalate polymer, aluminum chloride polymer, aluminum perchlorate polymer and aluminum iodide polymer, said aluminum polymers being prepared by slowly adding one mole of aluminum hydroxide gel to one mole of the particular monobasic acid or acid salt desired, and then drying the wetted metal without rinsing.

2. The process of claim 1 in which the concentration of the aluminum polymer expressed as grams/liter of aluminum ranges from 0.25 grams per liter to 2.5 grams per liter.

3. The process of claim 1 in which the aluminum polymer is aluminum nitrate polymer.

4. The process of claim 1 in which the aluminum polymer is aluminum formate polymer.

5. The process of claim 1 in which the aluminum polymer is aluminum lactate polymer.

6. The process of claim 1 in which the aluminum polymer is aluminum oxalate polymer.

7. The process of sealing a phosphate coated metal comprising wetting the phosphate coated metal by contacting it for a period ranging from about 1 second to about 1 hour with an aqueous solution having a temperature ranging from ambient temperature to about 200°F. of one or more aluminum polymers having a concentration of at least about 0.25 grams per liter of aluminum and selected from the group consisting of aluminum nitrate polymer, aluminum lactate polymer, aluminum formate polymer, aluminum oxalate polymer, aluminum chloride polymer, aluminum perchlorate polymer and aluminum iodide polymer, said aluminum polymers being prepared by slowly adding one mole of aluminum hydroxide gel to one mole of the particular monobasic acid or acid salt desired, drying the wetted metal, then rinsing the dried metal with water and finally re-drying the said metal.

8. The process of claim 7 in which the concentration of aluminum polymer solution expressed as grams per liter of aluminum ranges from 0.25 grams per liter to 2.5 grams per liter.

9. The process of claim 7 in which the aluminum polymer is aluminum nitrate.

10. The process of claim 7 in which the aluminum polymer is aluminum formate.

11. The process of claim 7 in which the aluminum polymer is aluminum lactate.

12. The process of claim 7 in which the aluminum polymer is aluminum oxalate.

13. The process of claim 1 in which the aqueous solution of the aluminum polymer also contains at least 0.1 gram per liter of triethanolamine nitrate.

14. The process of claim 7 in which the aqueous solution of the aluminum polymer contains at least 0.1 gram per liter of triethanolamine nitrate.

15. The process of sealing a phosphate coated metal comprising wetting the phosphate coated metal by contacting it for a period ranging from about 1 second to about 1 hour with an aqueous solution having a temperature ranging from ambient temperature to about 200°F. of one or more aluminum polymers having a concentration of at least about 0.25 grams per liter of aluminum and selected from the group consisting of aluminum nitrate polymer, aluminum lactate polymer, aluminum formate polymer, aluminum oxalate polymer, aluminum chloride polymer, aluminum perchlorate polymer and aluminum iodide polymer, said aluminum polymers being prepared by slowly adding one mole of aluminum hydroxide gel to one mole of the particular monobasic acid or acid salt desired, rinsing the wetted metal with water and drying the said metal.

16. The process of claim 15 in which the aqueous solution of the aluminum polymer also contains at least 0.1 gram per liter of triethanolamine nitrate.

* * * * *